United States Patent
Balakrishnan et al.

(10) Patent No.: US 6,337,788 B1
(45) Date of Patent: *Jan. 8, 2002

(54) FAULT CONDITION PROTECTION

(75) Inventors: Balu Balakrishnan; Alex Djenguerian, both of Saratoga; Leif Lund, San Jose, all of CA (US)

(73) Assignee: Power Integrations, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/192,871

(22) Filed: Nov. 16, 1998

(51) Int. Cl.$^7$ ................................................. H02H 3/18
(52) U.S. Cl. ............................. 361/86; 361/71; 363/50; 363/74
(58) Field of Search ............................. 361/35, 38, 71, 361/74, 75, 18, 91.1, 91.3, 93.1, 93.2, 93.4, 94, 83, 86, 87–89; 363/50, 74; 323/273, 276; 364/528.27, 528.31, 528.32, 528.33; 700/292, 296, 297

(56) References Cited

U.S. PATENT DOCUMENTS

| | | | | | |
|---|---|---|---|---|---|
| 4,394,703 A | * | 7/1983 | Butcher | ...................... | 361/101 |
| 4,761,702 A | * | 8/1988 | Pinard | ...................... | 361/18 |
| 4,887,199 A | * | 12/1989 | Whittle | ...................... | 363/49 |
| 5,550,437 A | * | 8/1996 | Hopkins et al. | ........ | 315/209 R |
| 5,796,596 A | * | 8/1998 | Williams | ...................... | 363/21 |
| 5,874,841 A | * | 2/1999 | Majid et al. | ................. | 327/94 |
| 5,949,154 A | * | 9/1999 | Williams | ...................... | 307/64 |

OTHER PUBLICATIONS

Ashok Bindra, "Power–Conversion Chip Cuts Energy Wastage in Off–Line Switchers," *Electronic Design*, pp. 46,48, Oct. 1998.

* cited by examiner

*Primary Examiner*—Kim Huynh
(74) *Attorney, Agent, or Firm*—Blakely, Sokoloff, Taylor & Zafman, LLP

(57) ABSTRACT

A circuit protects a power conversion system with a feedback control loop from a fault condition. The circuit has an oscillator having an input for generating a signal with a frequency and a timer connected to the oscillator input and to the feedback control loop. The timer disables the oscillator after a period following the opening of the feedback control loop to protect the power conversion system.

41 Claims, 5 Drawing Sheets

FAULT CONDITION PROTECTION

BACKGROUND

The present invention relates to an off-line switched mode control system with fault condition protection.

Quantum leaps in electronic technology have led to the development of "smart" electrical and electronic products. Each of these products requires a steady and clean source of power from a power supply. One power supply technology called switched mode power supply technology operates at a high frequency to achieve small size and high efficiency. In such a switching power supply, an integrated circuit (IC) regulator is connected in series with the primary winding of a transformer to a rectified and filtered alternating current (AC) power line. The energy is transferred from the primary winding through an output secondary winding to the power supply output in a manner controlled by the IC regulator so as to provide a clean and constant output voltage. Additionally, a third winding called a feedback or bias winding may be used to provide a feedback signal and power to the IC regulator.

The voltage on the feedback winding tracks the output voltage present on the secondary winding. Thus, when a short occurs on the output of the secondary winding, the voltage on the feedback winding also goes low. Further, in the event of a short circuit condition, an overload condition on the output secondary winding or an open loop condition on the feedback winding, the regulator circuit responds to such conditions by delivering maximum power over a period of time. In such cases, the regulator circuit detects that the power supply is short circuited, overloaded at the output or has encountered an open loop condition. In any of these fault conditions, the regulator circuit goes into a mode called "auto-restart." In the auto-restart mode, the regulator circuit tries to start the power supply periodically by delivering full power for a period of time (greater than needed for start up) and turns off the power supply for another period of time that is approximately four to ten times longer. As long as the fault condition is present, the regulator circuit remains in this auto-restart mode limiting the average output power to a safe, low value. When the fault is removed, auto-restart enables the power supply to start-up automatically.

SUMMARY

The invention protects a power supply from fault conditions. The power supply has an output and a feedback control loop, the feedback control loop having a feedback signal which cycles periodically when the power supply operates normally and which remains idle when the power supply is in a fault condition. In a first aspect, the circuit includes a switching device for controlling power delivered to the output and a timer coupled to the switching device and to the feedback signal. The timer disables the switching device to prevent power delivery to the output in a first predetermined period after the fault condition exists.

Implementations of the invention include one or more of the following. The timer may enable the switching device to deliver power to the output after a second predetermined period. The switching device may be alternately enabled for the first predetermined period and disabled for the second predetermined period when the fault condition exists. The switching device may be enabled upon removal of the fault condition. The switching device may be a power transistor. The timer may be a digital counter. An oscillator with a predetermined frequency may be coupled to the counter. The oscillator may have a control input for changing the predetermined frequency and a first current source coupled to the oscillator control input to generate a first frequency. A second current source may be coupled to the oscillator control input to generate a second frequency. The counter's output may be coupled to the fist and second current sources. The timer may be a capacitor which is adapted to be charged at a first rate from a first threshold to a second threshold to generate a first predetermined period. The capacitor may be discharged from the second threshold to the first threshold at a second rate to generate the second predetermined period. The capacitor may also be reset to a voltage below the first threshold each time the feedback signal cycles. The fault condition includes one or more of an output overload fault condition, an output short circuit fault condition and an open feedback control loop fault condition.

In a second aspect, a method for protecting a power supply having an output and a feedback control loop from fault conditions includes receiving a feedback signal from the feedback control loop, the feedback signal being adapted to cycle periodically when the power supply operates normally and to remain idle when the power supply is in a fault condition; timing the feedback signal to detect whether a fault condition exists in the power supply; and disabling the output after a first predetermined period after the fault condition is detected.

Implementations of the invention include one or more of the following. A switching device may be enabled to deliver power to the output after a second predetermined period. The switching device may be alternatingly enabled for the first predetermined period and disabled for the second predetermined period. The switching device may be enabled upon removal of the fault condition. The enabling step may enable a power transistor. The timing step includes digitally countering periods of time. A signal may be generated with a predetermined frequency. The generating step includes oscillating at a first frequency and a second frequency. The second frequency may be used when the fault condition exists. The timing step includes charging a capacitor at a first rate from a first threshold to a second threshold to generate a first predetermined period; and discharging the capacitor from the second threshold to the first threshold at a second rate to generate a second predetermined period. The capacitor may be reset to a voltage below the first threshold each time the feedback signal cycles.

In a third aspect, a circuit for protecting a power supply having an output and a feedback control loop from fault conditions includes means for receiving a feedback signal from the feedback control loop, the feedback signal being adapted to cycle periodically when the power supply operates normally and to remain idle when the power supply is in a fault condition; timing means coupled to the feedback signal to detect whether a fault condition exists in the power supply system; and means for disabling the output after a first predetermined period after the fault condition is detected.

Implementations of the invention include one or more of the following. The circuit includes a means for enabling a switching device to deliver power to the output after a second predetermined period. A means for alternatingly enabling the switching device for the first predetermined period and disabling the switching device for the second predetermined period when the fault condition exists may be used. The circuit may have a means for enabling the switching device upon removal of the fault condition. The switching device may be a power transistor. The timing means includes a digital counter. The circuit includes means for generating a predetermined frequency. The generating means includes means for oscillating at a first frequency and a second frequency. The circuit may include a means for applying the second frequency when the fault condition exists. The timing means includes a means for charging a capacitor at a first rate from a first threshold to a second threshold to generate a first predetermined period; and a means for discharging the capacitor from the second threshold to the first threshold at a second rate to generate a second predetermined period. A means for resetting the capacitor to a voltage below the first threshold each time the feedback signal cycles may be used.

In another aspect, a fault protected power supply includes a regulator coupled to a transformer having a primary winding. The transformer has a secondary winding coupled to a secondary output. The regulator receives a feedback signal from the secondary output which cycles periodically when the power supply operates normally and which remains idle when the power supply is in a fault condition. The power supply includes a switching device coupled to the primary winding of the transformer for controlling power delivered to the secondary output; an oscillator for generating a signal with a predetermined frequency; and a timer coupled to the oscillator and to the feedback signal, the timer disabling the switching device after a predetermined period of existence of a fault condition.

Implementations of the invention include one or more of the following. The power supply includes a means for changing the frequency of the oscillator. The timer alternatively enables and disables the switching means when the fault condition is present.

In another aspect, a method protects a power supply having a regulator coupled to a transformer having primary winding, the transformer having a secondary winding coupled to a secondary output, the regulator receiving a feedback signal from the secondary output which cycles periodically when the power supply operates normally and which remains idle when the power supply is in a fault condition. The method includes controlling power delivered to the secondary output using a switching device; generating an oscillating signal with a predetermined frequency; and timing the feedback signal with the oscillating signal and disabling the switching device after a predetermined period of existence of a fault condition.

Implementations of the invention include one or more of the following. The method includes changing the frequency of the oscillating signal. The method also includes alternatingly enabling and disabling the switching device when the fault condition is present.

In another aspect, a fault protected power supply has a regulator coupled to a transformer having a primary winding, the transformer having a secondary winding coupled to the secondary output. The regulator receives a feedback signal from the secondary output which cycles periodically when the power supply operates normally and which remains idle when the power supply is in a fault condition. The power supply includes a switching device coupled to the primary winding of the transformer for controlling the power delivered to the secondary output; a capacitor; means for charging the capacitor at a first rate from a first threshold to a second threshold to generate a first predetermined period and discharging the capacitor from the second threshold to first threshold at a second rate to generate a second predetermined period; and means coupled to the switching device, the capacitor and the feedback signal for alternately enabling the switching device during first predetermined period and disabling the switching device during the second predetermined period in the presence of a fault condition.

In yet another aspect, a method protects a power supply having a regulator coupled to a transformer having a primary winding. The transformer has a secondary winding coupled to a secondary output. The regulator receives a feedback signal from the secondary output which cycles periodically when the power supply operates normally and which remains idle when the power supply is in a fault condition. The method includes controlling power delivered to the secondary output using a switching device; charging a capacitor at a first rate from a first threshold to a second threshold to generate a first predetermined period; discharging the capacitor from the second threshold to first threshold at a second rate to generate a second predetermined period; and alternatingly enabling the switching device during the first predetermined period and disabling the switching device during the second predetermined period in the presence of a fault condition.

Advantages of the invention include one or more of the following. The invention protects the switched mode controller and associated components such as the diode and the transformer from various fault conditions. The feedback winding is not necessary. The protection is provided using a minimum number of components. Further, the power supply properly shuts down when it encounters a fault condition and automatically returns to an operating condition when the fault condition is removed.

DESCRIPTION

Figure 1:
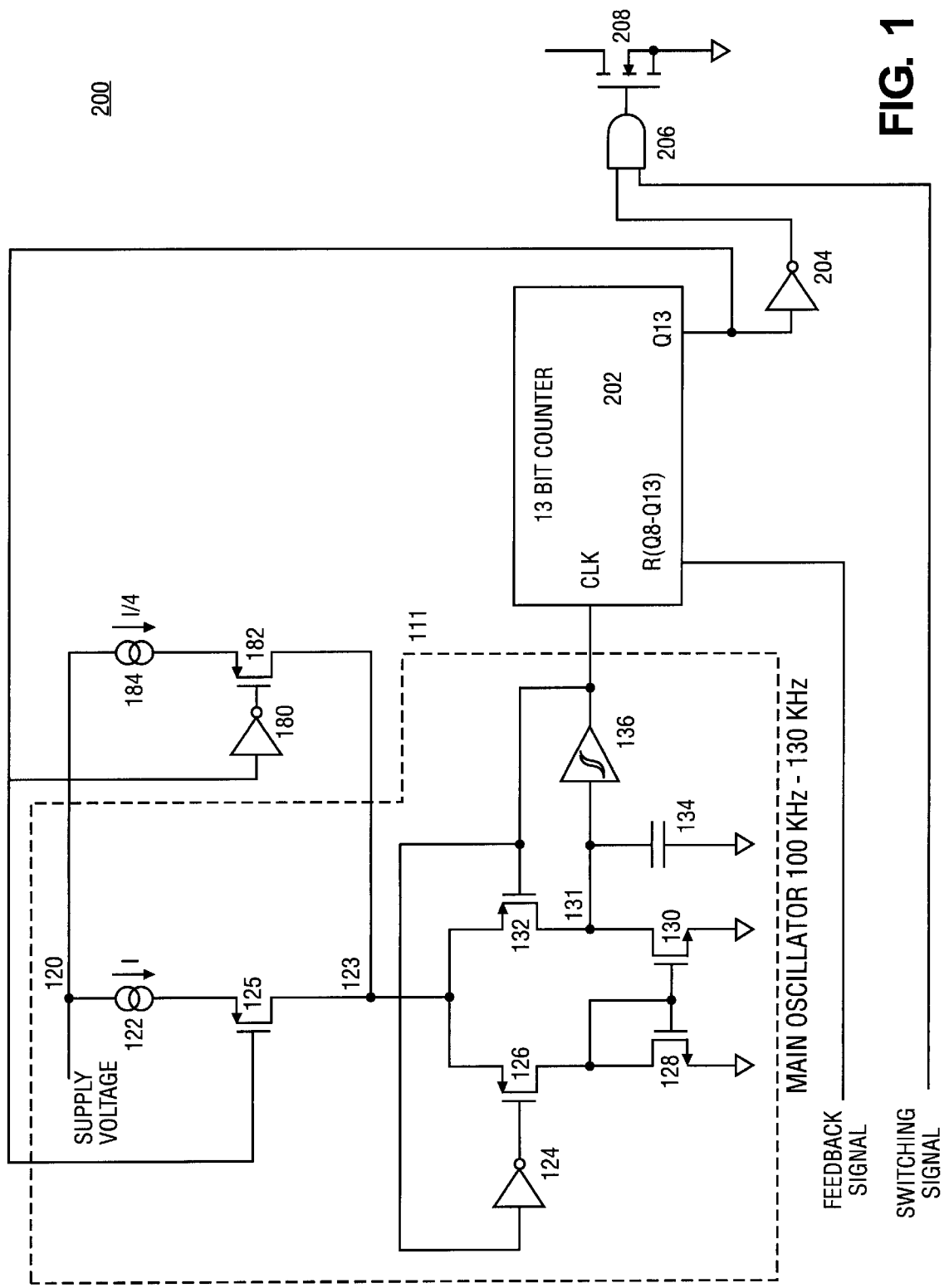
FIG. 1 is a schematic illustration of a fault condition protection device of the invention.

Referring now to FIG. 1, a fault-protection circuit 200 is shown. The circuit 200 has a primary oscillator 111 which is connected to a counter 202. The counter 202 can be reset by a feedback signal which clears registers Q8–Q13 of counter 202. The feedback signal is explained in more detail below.

An inverter 204 receives the 13-th bit output of counter 202. The output of inverter 204 is provided to an AND-gate 206 whose other input is connected to a switching signal. The switching signal is derived from the oscillator 111 output and the feedback signal. This switching signal cycles periodically when the power supply operates normally. The switching signal is idled when the power supply encounters a fault condition. The output of AND-gate 206 in turn is provided to the gate of a switching transistor 208. Counter 202 eventually causes an AND-gate 206 to shut-off switching transistor 208 and to perform auto-restart.

Turning now to oscillator 111, a current source 122 generates a current I from a supply voltage 120. The output of current source 122 is connected to the source of a p-channel MOSFET transistor 125, whose drain is connected to a node 123. Also connected to the node 123 through a p-channel MOSFET 182 is a second current source 184. Current source 184 can supply current which is ¼ of the current I. The drain of transistor 182 is also connected to node 123. The gate of transistor 182 is driven by an inverter 180, whose input is connected to the gate of transistor 125 and to the counter output Q13.

The node 123 is connected to the sources of p-channel MOSFET transistors 126 and 132. The drain of MOSFET transistor 126 is connected to the drain of an n-channel MOSFET transistor 128. The source of transistor 128 is grounded, while the gate of transistor 128 is connected to its drain. The gate of transistor 128 is also connected to the gate of an n-channel MOSFET transistor 130. The source of transistor 130 is grounded, while the drain of transistor 130 is connected to the drain of transistor 132 at a node 131. Transistors 126, 128, 130 and 132 form a differential switch. The input of inverter 124 and the gate of transistor 132 are driven by a hysteresis comparator 136. Output of inverter 124 drives the gate of MOSFET transistor 126. Comparator 136 has an input which is connected to node 131 and to a capacitor 134. The other node of the capacitor is connected to ground. In combination, transistors 126, 128, 130 and 132, capacitor 134, inverter 124 and hysteresis comparator 136 and current source 122 form an oscillator. The output of hysteresis comparator 136 is provided as an oscillator output and is also used to drive the clock input of counter 202.

Figure 5:
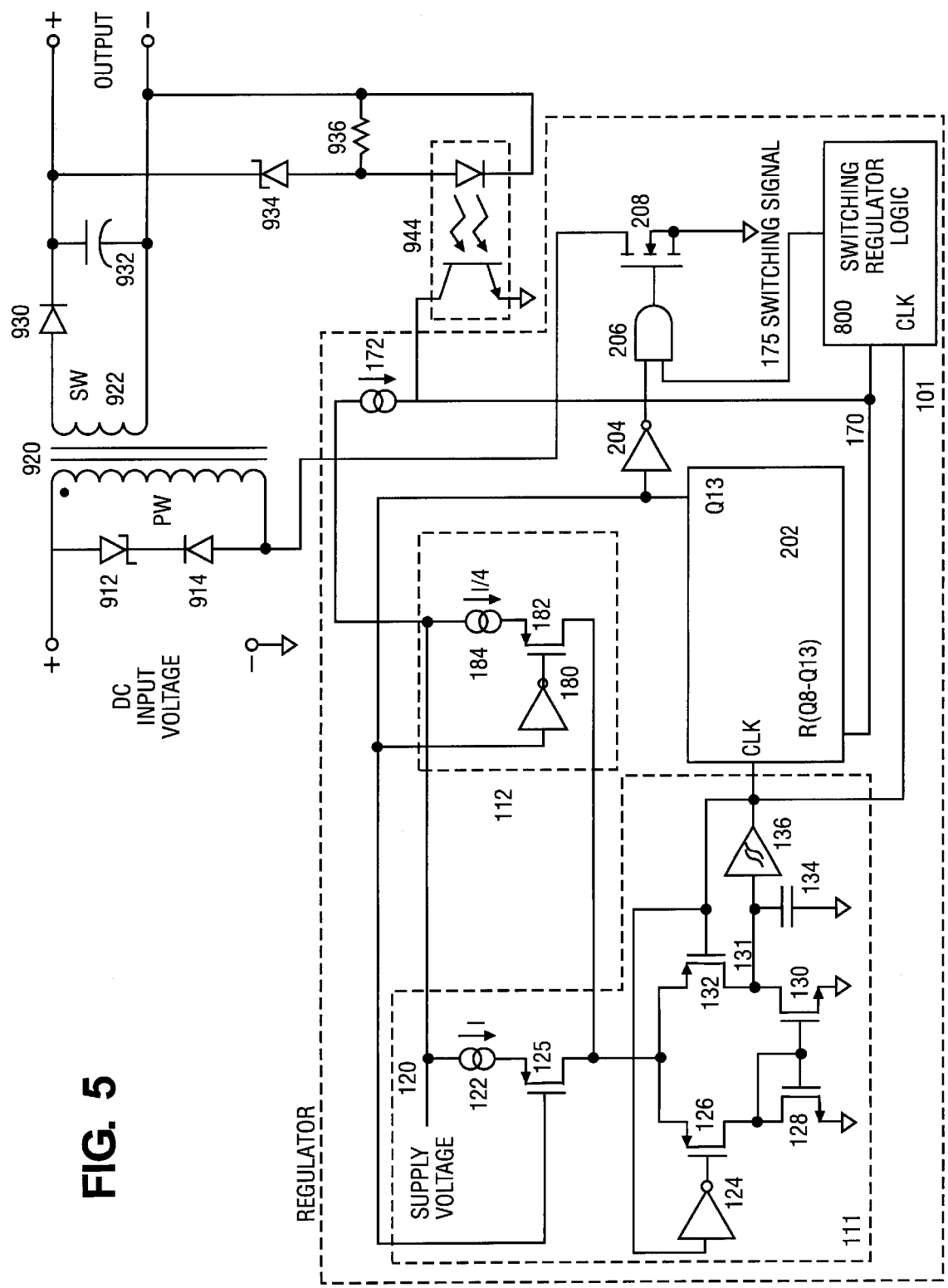
FIG. 5 is a schematic illustration of a switched mode power supply in accordance with the present invention.

During operation, the feedback signal periodically pulses between a low state and a high state depending on the amount of power required on a secondary winding 922 (FIG. 5). Every time the feedback signal is low, the feedback signal resets a counter whose states are reflected by outputs Q8–Q13 of counter 202. The resetting of the counter associated with outputs Q8–Q13 thus occurs regularly when no fault is present in the power supply. The cycling of the feedback signal constantly clears the output bit Q13 such that the power transistor 208 is controlled by the switching signal when no fault is present. However, in the event of a fault condition, the feedback signal remains high for a sufficiently long time such that the counter associated with output bits Q8–Q13 has enough time to increment output bit Q13. The setting of the output bit Q13 causes inverter 204 output to go low and thus causes the output of AND-gate 206 to be deasserted. The deassertion of AND-gate 206 in turn disables switching transistor 208. Also, when the counter output Q13 goes high transistor 125 turns off to isolate primary current source 122 from node 123. This turns on the transistor 182 via inverter 180, thus allowing the ¼ I current to flow from the secondary current source 184 to node 123. The state change of the counter output Q13 causes the oscillator to switch at one-fourth of its normal frequency to achieve about 20% on time and 80% off time. This operation reduces the power delivered by the power supply under a fault condition as well as avoids the possibility of damage to the regulator device and other power supply components such as the output diode or the transformer (not shown).

Figure 2:
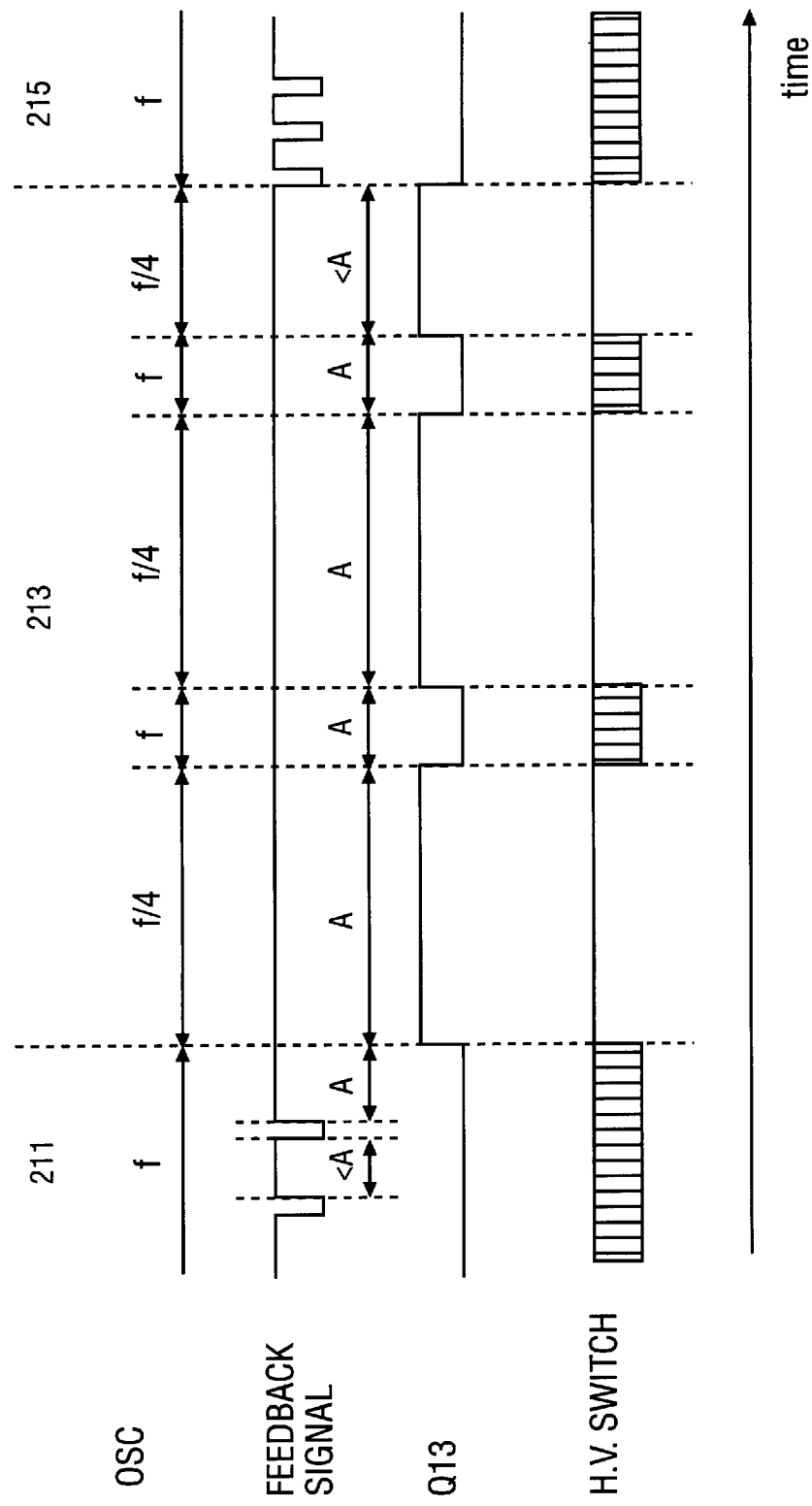
FIG. 2 is a plot illustrating the operation of the device of FIG. 1.

FIG. 2 shows a timing diagram for the device of FIG. 1. The timing diagram of FIG. 2 shows three periods: 211, 213 and 215. Period 211 is normal operation with the feedback signal going "low" more often than a predetermined count such as approximately 4096 clock cycles, thereby resetting the Auto Restart Counter before it counts up to 4096.

In Period 213, the-feedback signal has been "high" for 4096 continuous clock cycles due to a fault condition such as an output overload or short, so the circuit of FIG. 1 goes into the auto-restart mode. The oscillator frequency is divided by four and switching transistor 208 has been inhibited from switching, remaining in its off state. After 4096 clock cycles, switching transistor 208 is activated and the oscillator frequency switches back to normal frequency. This sequence will repeat itself as long as the feedback signal stays "high."

In Period 215, the overload condition or the short condition on the output of the power supply is removed and the feedback signal goes low, indicating the power supply output is in regulation. The circuit is now in normal operation with the feedback signal going "low" at least once every 4096 clock cycles. It is to be noted that the auto-restart capability as been described may not be used in all applications. Particularly, certain applications may disable the power regulator after detecting a fault condition and the disabling of the power regulator may continue until a user resets the power regulator, or until AC power is cycled OFF and then ON to the power regulator.

Figure 3:
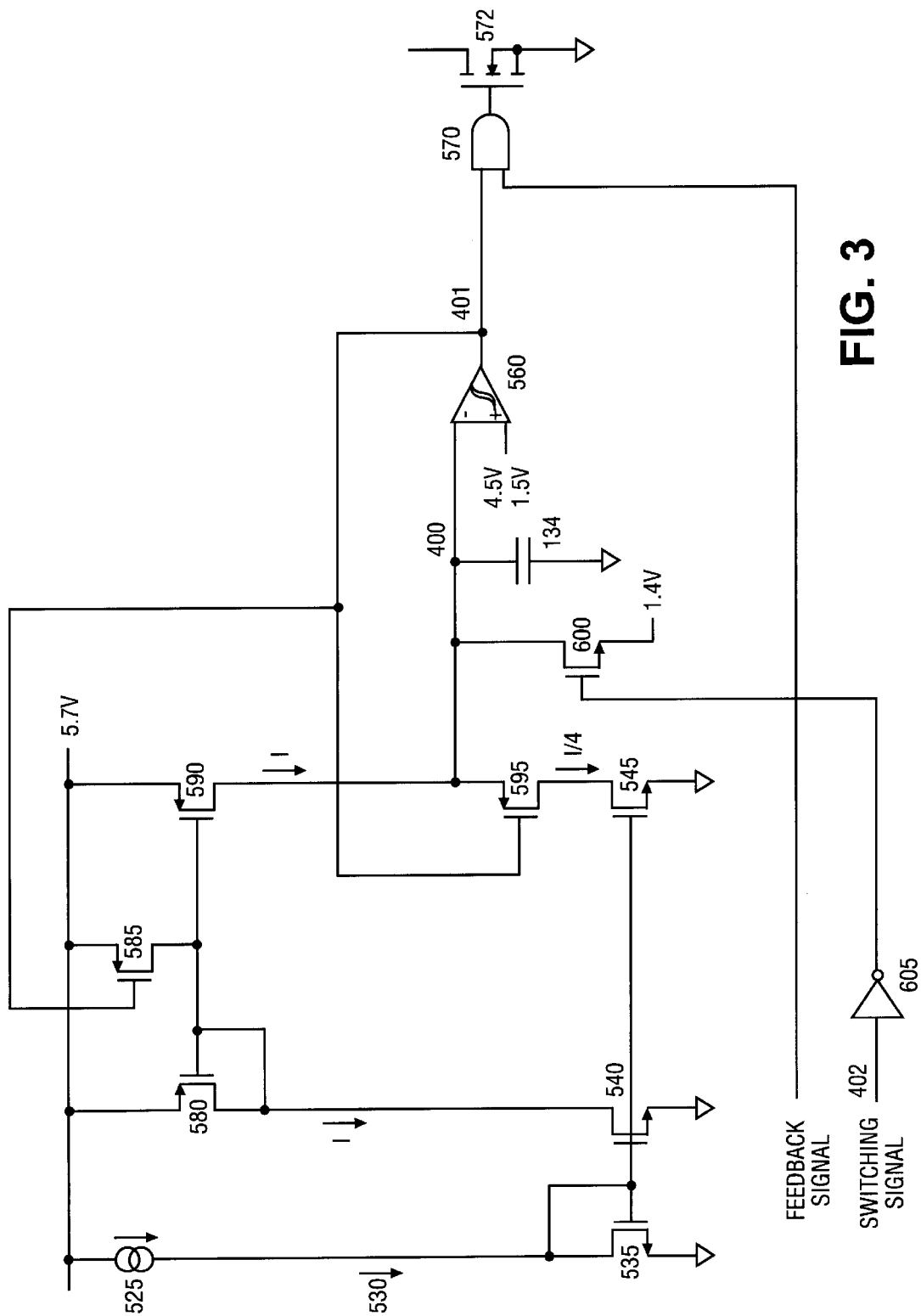
FIG. 3 is a schematic illustration of a second embodiment of the fault condition protection device.

FIG. 3 shows an analog auto restart circuit. A current source 525 produces a fixed magnitude current 530. Fixed magnitude current 530 is fed into first transistor 535 and mirrored to transistors 540 and 545. Third transistor 545 is connected to a capacitor 550 via transistor 595. Transistor 600 is also connected to the capacitor 550. Transistor 600 is controlled by the feedback signal provided to inverter 605 whose output drives the gate of the transistor 600. Node 400 is generated by the charging and discharging of capacitor 550. Capacitor 550 has a relatively low capacitance which allows for integration on a monolithic chip in one embodiment of the IC regulator of the invention. Node 400 is provided to a hysteresis comparator 560 which compares its input with a lower limit of about 1.5 volts and an upper limit of about 4.5 volts. The output of comparator 560 is provided to the gates of transistors 585 and 595. AND-gate 570 receives at one input the output of comparator 560. AND-gate 570 enables switching transistor 572 to turn on and off. AND-gate 570 receives at a second input a switching signal which modulates the regulator output.

In operation, after the feedback signal goes high, capacitor 550 begins to charge from a level below 1.5 volts to an upper threshold of about 4.5 volts. Upon reaching 4.5 volts, the output of comparator 560 switches and discharges the capacitor 550 through transistors 545 and 595. Node 400 then switches between the upper threshold of about 4.5 volts and the lower threshold of about 1.5 volts.

Signal 401 output of comparator 560 will be high until node 400 exceeds the upper threshold limit. When signal 400 is high, p-channel transistors 585 and 595 are turned off. By turning off transistors 585 and 595, current can flow into and steadily charge capacitor 550 and increase the magnitude of node 400. The current that flows into capacitor 550 is derived from current source 525 because the current through transistor 590 is mirrored from transistor 580, which current is derived from transistor 540.

Figure 4:
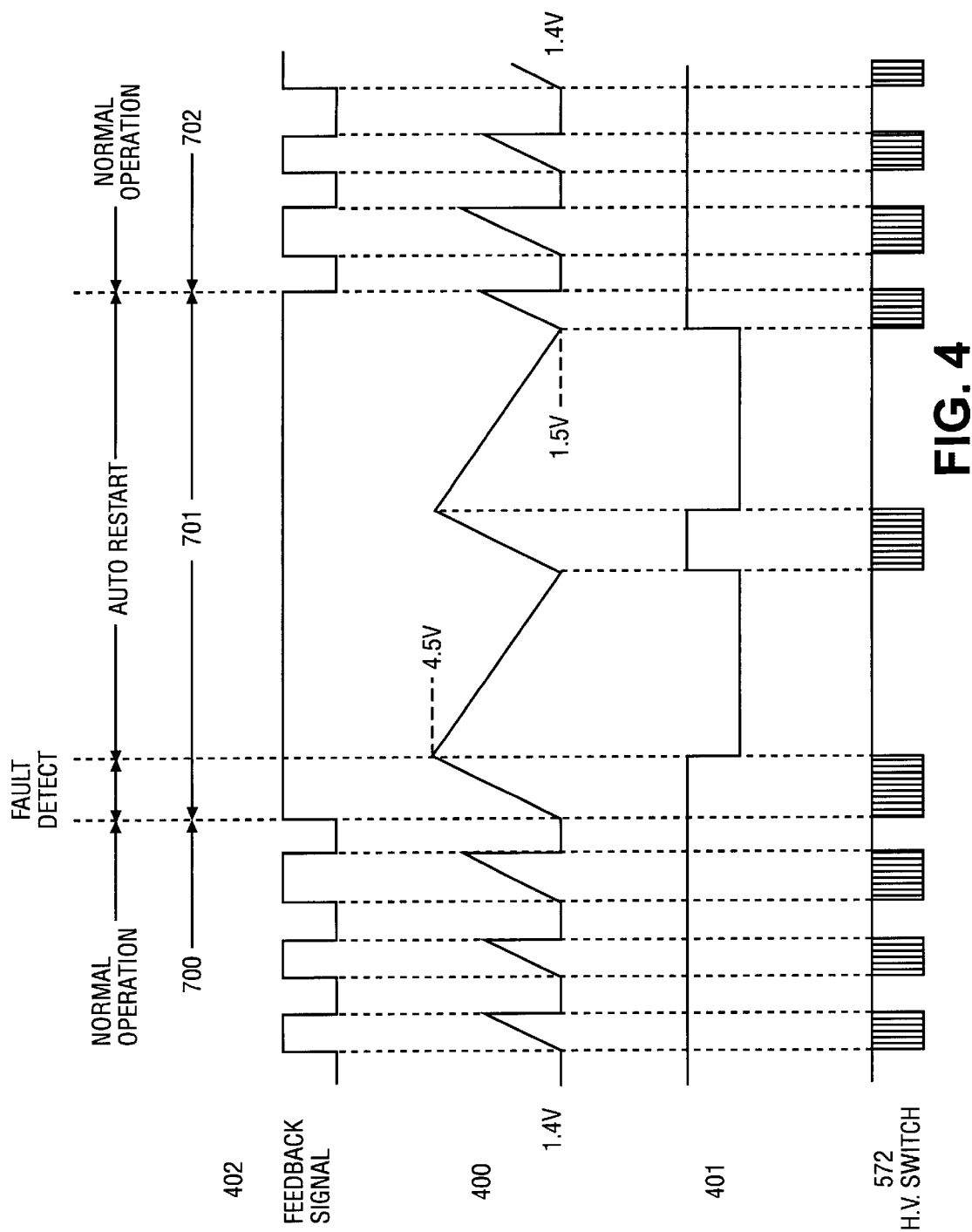
FIG. 4 is a plot illustrating the operation of the device of FIG. 2.

Referring to FIGS. 3 and 4, in period 700 feedback signal 402 is switching and the system is in normal operation with switching transistor 572 controlled by the switching signal. At the end of period 700 a fault condition has been detected and the feedback signal stays high for an extended period of time (period 701). In period 701, transistor 700 turns off, allowing capacitor 550 to be charged by current source 590. When the voltage on node 400 has reached the second threshold, the output 401 of comparator 560 goes low, disabling the switching transistor 572. Capacitor 550 will be discharged to the first threshold by current source 545 with switching transistor 572 disabled. This mode of oscillation continues until the feedback signal goes low again, indicating that the fault condition no longer exists. When the feedback signal 402 at the end of period 701 goes low, transistor 600 turns on and discharges capacitor 550 to a voltage below the first threshold. Comparator 560 output will go high and enable the switching signal to control the switching transistor 572. In period 702, the system has returned to normal operation with the feedback signal 402 going low at least once during a defined time period indicating that the regulator circuit is in regulation.

Referring now to FIG. 5, a switched mode power supply is shown. Direct current (DC) input voltage is provided to a Zener diode 912 which is connected to a diode 914. The diodes 912–914 together are connected in series across a primary winding of a transformer 920. A secondary winding 922 is magnetically coupled to the primary winding of transformer 920. One terminal of the secondary winding 922 is connected to a diode 930, whose output is provided to a capacitor 932. The junction between diode 930 and capacitor 932 is the positive terminal of the regulated output. The other terminal of capacitor 932 is connected to a second terminal of the secondary winding and is the negative terminal of the regulated output. A Zener diode 934 is connected to the positive terminal of the regulated output. The other end of Zener diode 934 is connected to a first end of a light emitting diode in an opto-isolator 944. A second end of the light-emitting diode is connected to the negative terminal of the regulated output. A resistor 936 is connected between the negative terminal of the regulated output and the first end of the light-emitting diode of opto-isolator 944. The collector of the opto-isolator 944 is connected to current source 172. The output of current source 172 is provided to the switching regulator logic 800.

Connected to the second primary winding terminal is the power transistor 208. Power transistor 208 is driven by AND gate 206 which is connected to inverter 204 and switching regulator logic 800. Switching regulator logic 800 receives a clock signal 101 from an oscillator 111. A counter 202 also receives the clock signal 101 from the primary oscillator 111. The output of counter 202, Q13, is used to switch in the current source 184 to supply current in lieu of the current source 122 when Q13 is high.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A circuit for protecting a power supply from fault conditions, comprising:
    a switching device coupled to receive a switching signal to control power delivered to an output of the power supply; and
    a timer coupled to the switching device and coupled to receive a feedback signal from a feedback control loop coupled to the output of the power supply, the feedback signal cycling periodically between a first state and a second state when the power supply operates normally and remaining idle when the power supply is in a fault condition, the switching signal cycling separately from cycling of the feedback signal, the timer disabling the switching device to prevent power delivery to the output in response to the feedback signal.

2. The circuit of claim 1 wherein the timer disables the switching device after a first period of existence of the fault condition and wherein the timer enables the switching device to deliver power to the output after a second period.

3. The circuit of claim 2 wherein the switching device is alternately enabled for the first period and disabled for the second period when the fault condition exists.

4. The circuit of claim 3 wherein the switching device is enabled upon removal of the fault condition.

5. The circuit of claim 4 wherein the timer includes a capacitor that is charged at a first rate from a first threshold to a second threshold to generate a first period, the capacitor further being discharged from the second threshold to the first threshold at a second rate to generate the second period.

6. The circuit of claim 5 wherein the capacitor is discharged to a voltage below the first threshold each time the feedback signal cycles.

7. The circuit of claim 1 wherein the switching device is a power transistor.

8. The circuit of claim 1 wherein the timer comprises a digital counter.

9. The circuit of claim 8 further comprising an oscillator coupled to the counter, the oscillator having a predetermined frequency.

10. The circuit of claim 9, wherein the oscillator has a control input for changing the predetermined frequency, further comprising a first current source coupled to the oscillator control input to generate a first frequency.

11. The circuit of claim 10 further comprising a second current source coupled to the oscillator control input to generate a second frequency.

12. The circuit of claim 11 wherein the counter has an output coupled to the first and second current sources.

13. The circuit of claim 1 wherein the fault condition includes one or more of an output overload fault condition, an output short circuit fault condition and an open feedback control loop fault condition.

14. A method for protecting a power supply from fault conditions, comprising:
    switching a switching device in response to a switching signal to control power delivery to an output of the power supply;
    timing a feedback signal of a feedback control loop coupled to the output of the power supply to detect whether a fault condition exists in the power supply, the feedback signal cycling periodically between a first state and a second state when the power supply operates normally and remaining idle when the power supply is in a fault condition, the switching signal cycling separately from cycling of the feedback signal; and
    disabling the switching device from switching in response to the feedback signal.

15. The method of claim 14 wherein the output is disabled after a first period of existence of the fault condition further comprising enabling a switching device to deliver power to the output after a second period.

16. The method of claim 15, further comprising alternatingly enabling the switching device for the first period and disabling the switching device for the second period.

17. The method of claim 16 further comprising enabling the switching device upon removal of the fault condition.

18. The method of claim 17 wherein the timing step includes:
    charging a capacitor at a first rate from a first threshold to a second threshold to generate a first period; and
    discharging the capacitor from the second threshold to the first threshold at a second rate to generate a second period.

19. The method of claim 18 further comprising discharging the capacitor to a voltage below the first threshold each time the feedback signal cycles.

20. The method of claim 16 wherein the timing step includes counting periods of time digitally.

21. The method of claim 20 further comprising generating a signal which oscillates at a first frequency when the switching device is enabled and oscillates at a second frequency when the switching device is disabled.

22. The method of claim 15 wherein the switching device is a power transistor.

23. The method of claim 14 wherein the fault condition includes one or more of an output overload fault condition, an output short circuit fault condition and an open feedback control loop fault condition.

24. A circuit for protecting a power supply from fault conditions, comprising:
switching means coupled to receive a switching signal for controlling power delivered to an output of the power supply;
timing means coupled to the switching means and coupled to receive a feedback signal from a feedback control loop coupled to the output of the power supply to detect whether a fault condition exists in the power supply, the feedback signal cycling periodically between a first state and a second state when the power supply operates normally and remaining idle when the power supply is in a fault condition, the switching signal cycling separately from cycling of the feedback signal; and
means for disabling the switching means in response to the feedback signal.

25. The circuit of claim 24 wherein the output is disabled after a first period of existence of the fault condition further comprising means for enabling a switching device to deliver power to the output after a second period.

26. The circuit of claim 25, further comprising means for alternatingly enabling the switching device for the first period and disabling the switching device for the second period.

27. The circuit of claim 26 further comprising means for enabling the switching device upon removal of the fault condition.

28. The circuit of claim 27 wherein the timing means includes a digital counter.

29. The circuit of claim 28 further comprising means for oscillating at a first frequency when the switching device is enabled and at a second frequency when the switching device is disabled.

30. The circuit of claim 25 wherein the switching device is a power transistor.

31. The circuit of claim 24 wherein the fault condition includes one or more of an output overload fault condition, an output short circuit fault condition and an open feedback control loop fault condition.

32. The circuit of claim 24 wherein the timing means includes:
means for charging a capacitor at a first rate from a first threshold to a second threshold to generate a first period; and
means for discharging the capacitor from the second threshold to the first threshold at a second rate to generate a second period.

33. The circuit of claim 32 further comprising means for discharging the capacitor to a voltage below the first threshold each time the feedback signal cycles.

34. A fault protected power supply, comprising:
a transformer having a primary winding and a secondary winding coupled to a secondary output;
a switching device coupled to the primary winding of the transformer for controlling power delivered to the secondary output in response to a switching signal;
an oscillator for generating a signal with a predetermined frequency; and
a timer coupled to the oscillator and coupled to receive a feedback signal from the secondary output, the feedback signal cycling periodically between a first state and a second state when the power supply operates normally and remaining idle when the power supply is in a fault condition, the switching signal cycling separately from cycling of the feedback signal, the timer disabling the switching device in response to the feedback signal.

35. The power supply of claim 34 further comprising means for changing the frequency of the oscillator.

36. The regulator circuit of claim 34 wherein the timer alternatively enables and disables the switching device when the fault condition is present.

37. A method for protecting a power supply, comprising:
controlling power delivered to a secondary output of the power supply using a switching device switched in response to a switching signal and coupled to a primary winding of a transformer, the transformer having a secondary winding coupled to the secondary output;
generating an oscillating signal with a predetermined frequency;
timing a feedback signal from the secondary output with the oscillating signal, the feedback signal cycling periodically between a first state and a second state when the power supply operates normally and remaining idle when the power supply is in a fault condition, the switching signal cycling separately from cycling of the feedback signal; and
disabling the switching device in response to the feedback signal.

38. The method of claim 37 further comprising changing the frequency of the oscillating signal.

39. The method of claim 37 further comprising alternatingly enabling and disabling the switching device when the fault condition is present.

40. A fault protected power supply, comprising:
a transformer having a primary winding and a secondary winding coupled to a secondary output;
a switching device coupled to the primary winding of the transformer for controlling the power delivered to the secondary output in response to a switching signal;
a capacitor;
means for charging the capacitor at a first rate from a first threshold to a second threshold to generate a first period and discharging the capacitor from the second threshold to first threshold at a second rate to generate a second period; and
means coupled to the switching device, the capacitor and coupled to receive a feedback signal from the secondary output, for alternately enabling the switching device during first period and disabling the switching device during the second period in response to the feedback signal, the feedback signal cycling periodically between a first state and a second state when the power supply operates normally and remaining idle when the power supply is in a fault condition, the switching signal cycling separately from cycling of the feedback signal.

41. A method for protecting a power supply, comprising:
controlling power delivered to a secondary output of the power supply using a switching device switched in response to a switching signal and coupled to a primary winding of a transformer, the transformer having a secondary winding coupled to the secondary output;

charging a capacitor at a first rate from a first threshold to a second threshold to generate a first period;

discharging the capacitor from the second threshold to first threshold at a second rate to generate a second period; and alternatingly enabling the switching device during the first period and disabling the switching device during the second period in response to a feedback signal from the secondary output, the feedback signal cycling periodically between a first state and a second state when the power supply operates normally and remaining idle when the power supply is in a fault condition, the switching signal cycling separately from cycling of the feedback signal.

* * * * *

UNITED STATES PATENT AND TRADEMARK OFFICE
CERTIFICATE OF CORRECTION

PATENT NO. : 6,337,788 B1
DATED : January 8, 2002
INVENTOR(S) : Balakrishnan et al.

It is certified that error appears in the above-identified patent and that said Letters Patent is hereby corrected as shown below:

<u>Column 2,</u>
Line 34, delete "countering" and insert -- counting --.

Signed and Sealed this

Twenty-third Day of April, 2002

Attest:

*Attesting Officer*

JAMES E. ROGAN
*Director of the United States Patent and Trademark Office*